United States Patent
Vijayendra et al.

(10) Patent No.: US 10,216,877 B2
(45) Date of Patent: Feb. 26, 2019

(54) SMART DIAGNOSIS OF INTEGRATED CIRCUITS INCLUDING IP CORES WITH ENCRYPTED SIMULATION MODELS

(71) Applicant: Altera Corporation, San Jose, CA (US)

(72) Inventors: Vishwas Tumkur Vijayendra, San Jose, CA (US); Bo Zhou, Milpitas, CA (US)

(73) Assignee: Altera Corporation, San Jose, CA (US)

( * ) Notice: Subject to any disclaimer, the term of this patent is extended or adjusted under 35 U.S.C. 154(b) by 32 days.

(21) Appl. No.: 15/278,051

(22) Filed: Sep. 28, 2016

(65) Prior Publication Data
US 2018/0089352 A1    Mar. 29, 2018

(51) Int. Cl.
*G06F 9/455* (2018.01)
*G06F 17/50* (2006.01)

(52) U.S. Cl.
CPC ...... *G06F 17/5036* (2013.01); *G06F 17/5022* (2013.01); *G06F 17/5045* (2013.01)

(58) Field of Classification Search
USPC ........................................ 716/105, 106, 107
See application file for complete search history.

(56) References Cited

U.S. PATENT DOCUMENTS

| | | | |
|---|---|---|---|
| 6,760,898 B1 | 7/2004 | Sanchez | |
| 7,240,303 B1* | 7/2007 | Schubert | G01R 31/31705 703/13 |
| 7,536,277 B2 | 5/2009 | Pattipatti | |
| 8,581,618 B1* | 11/2013 | Fritz | H03K 19/17768 326/37 |
| 2012/0011411 A1 | 1/2012 | Dervisoglu et al. | |
| 2012/0047413 A1 | 2/2012 | Chung | |
| 2014/0109029 A1 | 4/2014 | Bai et al. | |
| 2015/0382208 A1 | 12/2015 | Elliott et al. | |

OTHER PUBLICATIONS

International Search Report and Written Opinion for PCT Patent Application No. PCT/US17/45999, dated Nov. 23, 2017, 16 pages.

* cited by examiner

*Primary Examiner* — Brian Ngo
(74) *Attorney, Agent, or Firm* — Compass IP Law PC

(57) ABSTRACT

The present embodiments relate to methods for simulating the behavior of an IP core that has an encrypted simulation model. The encrypted simulation model of the IP core may include a plurality of probes, which a debug option may activate selectively, if desired. The encrypted simulation model may collect data during a simulation as selected by the activated probes of the plurality of probes. The encrypted simulation model may perform smart diagnosis of the collected data based on a set of rules and generate feedback messages that may suggest corrective action in the event of a simulation failure.

16 Claims, 10 Drawing Sheets

SMART DIAGNOSIS OF INTEGRATED CIRCUITS INCLUDING IP CORES WITH ENCRYPTED SIMULATION MODELS

BACKGROUND

The present embodiments relate to integrated circuit designs and, more particularly, to simulation models of intellectual property cores (IP cores) or IP blocks that are implemented in integrated circuits such as programmable logic devices (PLDs), application-specific integrated circuits (ASICs), application-specific standard products (ASSPs) or graphic processing units (GPUs). Some examples of PLDs include programmable logic arrays (PLAs), programmable array logic (PAL), generic array logic (GAL), complex programmable logic devices (CPLDs) and field programmable gate arrays (FPGAs).

A circuit design that is implemented with an integrated circuit typically includes various IP cores. IP cores could be provided as data (i.e., so-called soft IP cores) or as a circuit block (i.e., so-called hard IP cores or hard IP blocks). The 100G Interlaken IP core and the 100G Ethernet IP core are examples for soft IP cores provided by PLD vendors, while transceivers, memory controllers, or digital signal processors (DSPs) are examples for hard IP blocks in PLDs. IP cores provide various benefits. For example, the reuse of previously developed IP blocks shortens the development cycle of new applications. It is very common to provide simulation models with the IP cores, for example at the Register Transfer Level (RTL) to test and verify the behavior of the IP block with the remainder of the circuit design, before the circuit design is implemented with the integrated circuit.

SUMMARY

A method for modeling an IP core with an encrypted simulation model that includes a plurality of probes may include activating probes of the plurality of probes in the encrypted simulation model based on a debug option. The method may further include collecting data selected by the probes of the plurality of probes in the encrypted simulation model during a simulation of the IP core, performing smart diagnosis of the data in the encrypted simulation model based on a set of rules, and generating feedback messages based on the smart diagnosis.

It is appreciated that the embodiments described herein can be implemented in numerous ways, such as a process, an apparatus, a system, a device, or a method executed on a processing machine. Several inventive embodiments are described below.

In certain embodiments, the above mentioned method for simulating an IP core, and more specifically the activating of the probes of the plurality of probes may further include activating the debug option. In response to activating the debug option, the method may further include selectively activating a subset of the plurality of probes in the encrypted simulation model.

If desired, the performing of smart diagnosis may include determining whether at least a portion of the data violates a rule of the set of rules. In some embodiments, performing smart diagnosis of the encrypted simulation model may include in response to determining that a portion of the data violates the rule of the set of rules, performing a root cause analysis to identify a reason that the data violates the rule.

If desired, generating feedback messages may include providing a suggested corrective action based on the reason that the data violates the rule. In some embodiments, collecting data of the above mentioned method may further include generating check points that monitor simulation signals when performing the simulation of the IP core. If desired, collecting data may include generating variations of the simulation signals that anticipate potential error conditions.

Further features of the invention, its nature and various advantages, will be apparent from the accompanying drawings and the following detailed description of the preferred embodiments.

BRIEF DESCRIPTION OF THE DRAWINGS

FIG. 9 is a diagram of a flow chart showing illustrative steps of a method for simulating an integrated circuit in accordance with an embodiment.

DETAILED DESCRIPTION

Figure 1:
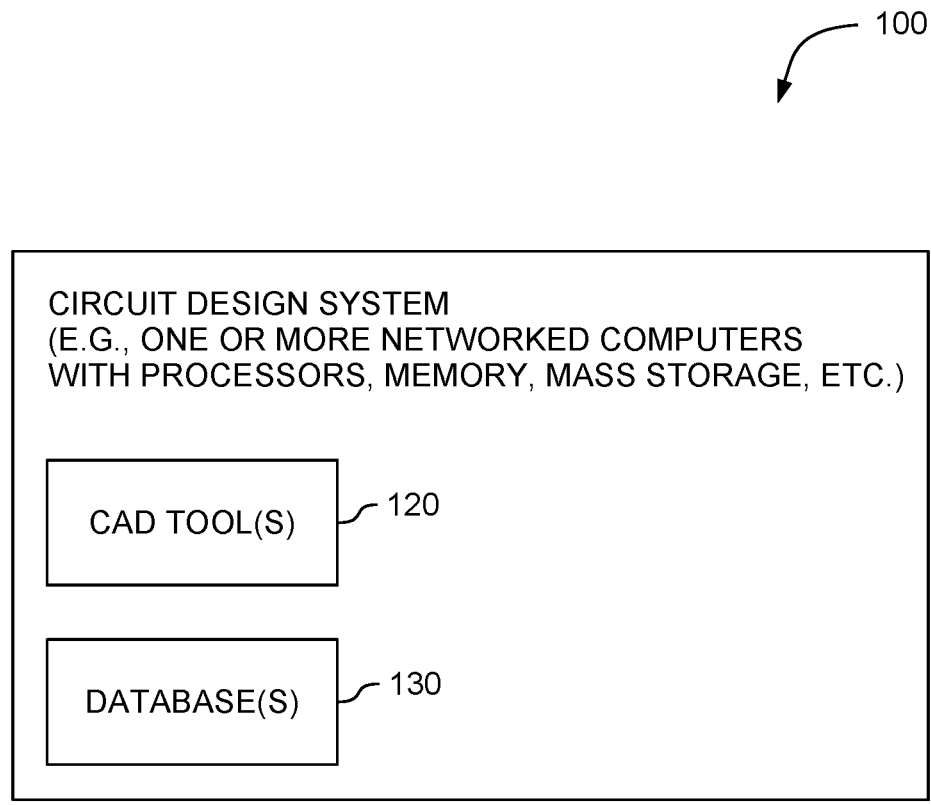
FIG. 1 is a diagram of an illustrative circuit design system that may be used to design integrated circuits in accordance with an embodiment.

The present embodiments provided herein relate to integrated circuits and, more particularly, to simulation models for IP cores that are implemented in integrated circuits.

IP cores that are sometimes also referred to as IP blocks are typically provided with simulation models that enable verification of the IP cores. Simulation models may include simulation models at the register transfer level (RTL) for digital IP cores and behavioral simulation models for analog IP cores or a combination of both. Simulation models of third party IP cores are typically encrypted to protect the contents of the IP cores.

Circuit designers may want to integrate IP cores in a circuit design and verify the behavior of the circuit design with the embedded IP cores before implementing that circuit design in hardware (e.g., with an integrated circuit). Performing simulations may involve spending significant time for running, debugging, verifying, and validating these simulations, especially when working with encrypted simulation models.

As an example, consider the scenario in which a circuit designer simulates the behavior of a circuit design that includes at least one IP core that is modeled by an encrypted simulation model. In this scenario, the encrypted simulation model may have a well-defined interface that defines the input and output signals. Thus, the simulation run may provide data signals to the encrypted simulation model and receive data signals from the encrypted simulation model via the interface. The simulation run typically observes a subset of the signals in a circuit design and reports a simulation failure when such a signal has a value that differs from the expected value. A circuit designer may analyze such a simulation failure by starting from a known correct state and tracing signals as they propagate through the circuit design.

However, a circuit designer may not be able to analyze simulation failures that occur within the IP core or are based on data generated within the IP core, because signals cannot be traced in the encrypted simulation model. Those failures may be caused by the encrypted simulation model (e.g., a defective IP core or a defective simulation model), by providing defective input signals to the encrypted simulation model, or by an incorrect configuration of the IP core.

In some cases, for example if the encrypted simulation model does not provide sufficient information to fix the issue, the circuit designer may need support from the IP core vendor, who has to reproduce the circuit designer's simulation failure by running simulations on a typically unfamiliar circuit design and debug the occurring simulation failures.

In other cases, a circuit designer may not want to share information about the circuit design with the IP core vendor for confidentiality reasons and to protect the contents of the circuit design.

For all these reasons, it may be desirable to propose an encrypted simulation model that performs smart diagnosis while simulation is running and provides feedback and suggestions for avoiding error conditions to the circuit designer.

It will be recognized by one skilled in the art, that the present exemplary embodiments may be practiced without some or all of these specific details. In other instances, well-known operations have not been described in detail in order not to unnecessarily obscure the present embodiments.

An illustrative circuit design system 100 in accordance with an embodiment is shown in FIG. 1. Circuit design system 100 may be based on one or more processors such as personal computers, workstations, etc. The processor(s) may be linked using a network (e.g., a local or wide area network). Memory in these computers or external memory and storage devices such as internal and/or external hard disks may store instructions and data.

Software-based components such as computer-aided design (CAD) tools 120 and databases 130 may reside on circuit design system 100. During operation, executable software such as the software of computer-aided design (CAD) tools 120 may run on the processor(s) of circuit design system 100. Databases 130 may store data for the operation of circuit design system 100. If desired, software and data may be stored on any computer-readable medium (storage) in circuit design system 100. Such storage may include computer memory chips, removable and fixed media such as hard disk drives, flash memory, compact discs (CDs), digital versatile discs (DVDs), Blu-ray discs (BDs), other optical media, and floppy diskettes, tapes, or any other suitable memory or storage device(s).

When the software of circuit design system 100 is installed, the storage of circuit design system 100 has instructions and data that may cause the computing equipment in circuit design system 100 to execute various methods (processes). When performing these processes, the computing equipment may be configured to implement the functions of the circuit design system.

The computer-aided design (CAD) tools 120, some or all of which are sometimes referred to collectively as a CAD tool or an electronic design automation (EDA) tool, may be provided by a single vendor or by multiple vendors. CAD tools 120 may be provided as one or more suites of tools (e.g., a compiler suite for performing tasks associated with implementing a circuit design in a programmable logic device) and/or as one or more separate software components (tools). Database(s) 130 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. CAD tools 120 may also pass information between each other without storing information in a shared database if desired.

Figure 2:
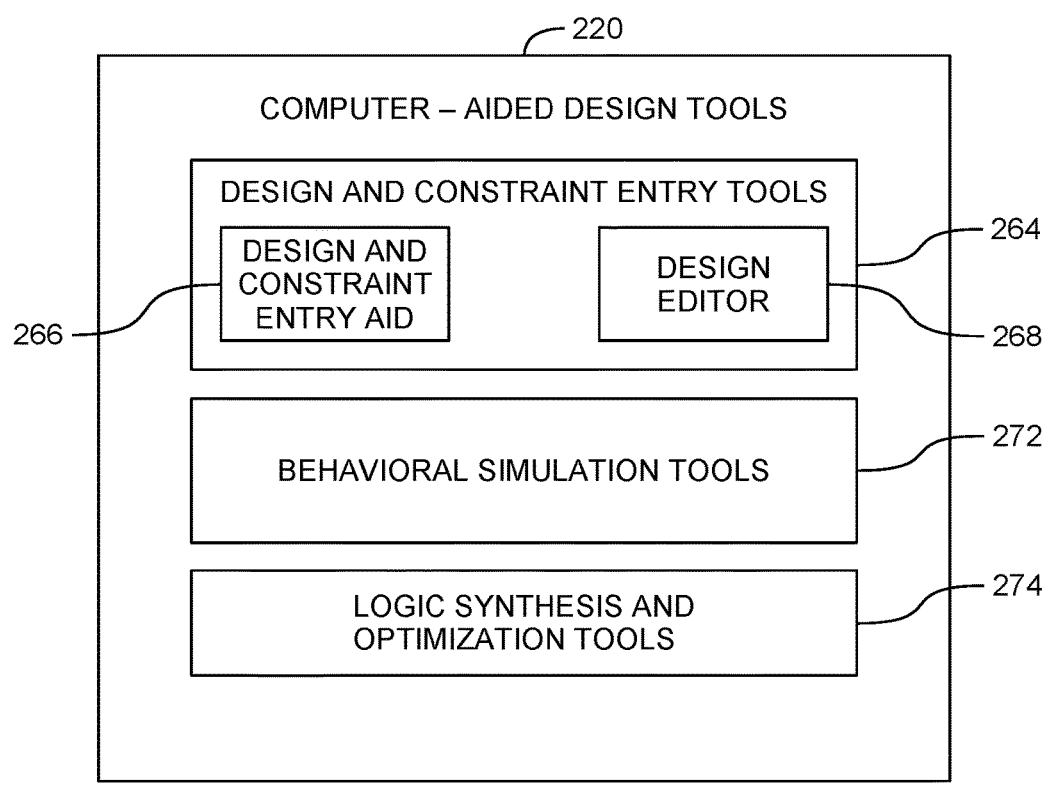
FIG. 2 is a diagram of illustrative computer-aided design (CAD) tools that may be used in a circuit design system in accordance with an embodiment.

Illustrative computer-aided design tools 220 that may be used in a circuit design system such as circuit design system 100 of FIG. 1 are shown in FIG. 2.

The design process may start with the formulation of functional specifications of an integrated circuit design (e.g., a functional or behavioral description of the integrated circuit design). For example, a circuit designer may formulate the functional specification of a circuit design using design and constraint entry tools 264. Design and constraint entry tools 264 may include tools such as design and constraint entry aid 266 and design editor 268. Design and constraint entry aid 266 may help a circuit designer retrieve a circuit design from a library of existing circuit designs and may provide computer-aided assistance to the circuit designer for entering (specifying) the circuit design.

As an example, design and constraint entry aid 266 may be used to present screens of options for a circuit designer. The circuit designer may click on on-screen options to select whether the circuit being designed should have certain features. Design editor 268 may be used to enter a design (e.g., by entering lines of hardware description language code), may be used to edit a design obtained from a library (e.g., using design and constraint entry aid 266), or may assist a circuit designer in selecting and editing appropriate prepackaged code/designs.

Design and constraint entry tools 264 may be used to allow a circuit designer to provide a desired circuit design using any suitable format. For example, design and constraint entry tools 264 may include tools that allow the circuit designer to enter a circuit design using truth tables. Truth tables may be specified using text files or timing diagrams and may be imported from a library. Truth table circuit design and constraint entry may be used for a portion of a circuit or for an entire circuit.

As another example, design and constraint entry tools 264 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a circuit design to be imported with the schematic capture tools.

If desired, design and constraint entry tools 264 may allow the circuit designer to provide a circuit design to the circuit design system 100 using a hardware description language such as Verilog Hardware Description Language (Verilog HDL) or Very High Speed Integrated Circuit Hardware Description Language (VHDL). The circuit designer may enter the circuit design by writing hardware description language code with design editor 268. Blocks of code may be imported from libraries maintained by the circuit designer and/or from commercial libraries if desired.

After the circuit design has been entered using design and constraint entry tools 264, behavioral simulation tools 272 may be used to simulate the functional performance of the circuit design. If the functional performance of the design is incomplete or incorrect, the circuit designer may make changes to the circuit design using design and constraint entry tools 264.

The functional operation of the new circuit design may be verified using behavioral simulation tools 272 before synthesis operations are performed using logic synthesis and optimization tools 274. Simulation tools such as behavioral simulation tools 272 may also be used at other stages in the design flow if desired (e.g., after logic synthesis). The output of the behavioral simulation tools 272 may be provided to the circuit designer in any suitable format (e.g., truth tables, timing diagrams, etc.). For example, upon detection of a simulation failure, behavioral simulation tools 272 may provide feedback related to potential error conditions and suggest changes to the circuit design for overcoming the potential error conditions, using constraint entry tools 264, if desired.

Once the functional operation of the circuit design has been determined to be satisfactory, logic synthesis and optimization tools 274 may generate a gate-level netlist of the circuit design, for example using gates from a particular library pertaining to a targeted process supported by a foundry, which has been selected to produce the integrated circuit.

If desired, computer-aided design tools 220 may include additional tools such as placement and routing tools or analysis tools, to name a few.

Figure 3:
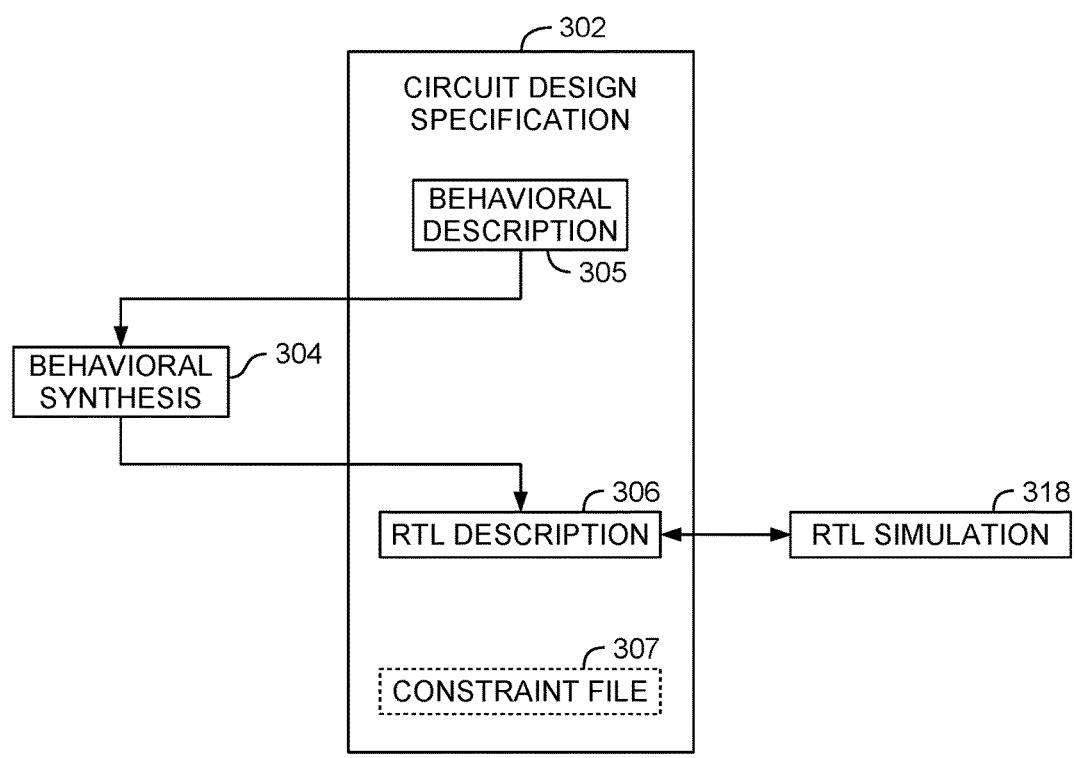
FIG. 3 is a diagram of a flow chart showing illustrative steps for designing an integrated circuit in accordance with an embodiment.

Illustrative operations involved in using CAD tools 220 of FIG. 2 are shown in FIG. 3. As shown in FIG. 3, a circuit designer may provide a circuit design specification 302, which is sometimes also referred to as a circuit design description or a circuit design.

The circuit design specification 302 may include a behavioral description 305 provided in the form of an application code (e.g., C code, C++ code, SystemC code, etc.). In some scenarios, the circuit design specification may include a register transfer level (RTL) description 306. RTL description 306 may have any form of describing circuit functions at the register transfer level. For example, RTL description 306 may be provided using a hardware description language such as the Verilog Hardware Description Language (Verilog HDL or Verilog), the SystemVerilog Hardware Description Language (SystemVerilog HDL or SystemVerilog), or the Very High Speed Integrated Circuit Hardware Description Language (VHDL). If desired, RTL description 306 may be provided as a schematic representation.

Behavioral description 305 may include untimed or partially timed functional code (i.e., the application code does not describe cycle-by-cycle hardware behavior), whereas the RTL description 306 may include a fully timed circuit design description that details the cycle-by-cycle behavior of the circuit design at the register transfer level.

Circuit design specification 302 may include target criteria such as area use, power consumption, delay minimization, clock frequency optimization, or any combination thereof, which may be collectively referred to as constraints. Those constraints may be provided for individual paths, portions of individual paths, portions of the circuit design, or for the entire circuit design. For example, the constraints may be provided with the behavioral description 305, the RTL description 306 (e.g., as a pragma or as an assertion), in constraint file 307, or through input from the circuit designer (e.g., using the design and constraint entry tools 264 of FIG. 2), to name a few.

In certain embodiments, a given path may have more than one constraint associated with the path, and some of these constraints may be in conflict with each other. For example, a first constraint received with behavioral description 305 for a given path may conflict with a second constraint received with RTL description 306 and with a third constraint received with constraint file 307. In this scenario, a predetermined priority of constraints, which may be defined explicitly or resolved implicitly by CAD tools such as CAD tools 220 of FIG. 2, may determine which of the conflicting constraints is selected. For example, a constraint from the circuit designer or constraint file 307 may override the constraints received from other sources, and a constraint received with RTL description 306 may override a constraint received with behavioral description 305.

The constraints may target the entire circuit design or portions of the circuit design. For example, some constraints may be defined globally and thus be applicable to the entire circuit design. Other constraints may be assigned locally and thus be applicable only to the corresponding portions of the circuit design. Consider the scenario in which the circuit design is organized hierarchically. In this scenario, every hierarchical instance may include different assignments. In other words, multiple different constraints may target the same portion of the circuit design, and priorities may be defined explicitly or resolved implicitly by CAD tools such as CAD tools 220 of FIG. 2. For example, a constraint defined at a higher level of the circuit design hierarchy may override a constraint at a lower level. Alternatively, a constraint defined at a lower level of the circuit design hierarchy may override a constraint at a higher level, or individual levels of the circuit design hierarchy may be given priority over other levels of circuit design hierarchy.

Constraints included in circuit design specification 302 may be conveyed to CAD tools such as CAD tools 220 of FIG. 2 in the form of variables, parameters, compiler directives, macros, pragmas, or assertions, just to name a few. CAD tools 220 may use constraint file 307, which may include a portion or all of the constraints. In some scenarios, a portion or all of the constraints may be embedded in behavioral description 305 and/or RTL description 306. If desired, the circuit designer may define the constraints using design and constraint entry tools 264 of FIG. 2.

At step 304, behavioral synthesis (sometimes also referred to as algorithmic synthesis) may be performed to convert behavioral description 305 into RTL description 306. Step 304 may be skipped if the circuit design specification is already provided in form of an RTL description. In some embodiments, RTL description 306 may instantiate IP cores.

At step 318, behavioral simulation tools (e.g., behavioral simulation tools 272 of FIG. 2) may perform an RTL simulation of an RTL description, which may verify the functional performance of the RTL description. For example, RTL simulation 318 may use a test bench that instantiates RTL description 306, which may instantiate encrypted simulation models of IP cores.

If desired, the test bench may include stimuli and expected states of predetermined nodes in RTL description 306, which are sometimes also referred to as expected results. During simulation, a simulator tool may execute the test bench. Executing the test bench may involve providing the stimuli to RTL description 306, propagating the stimuli through the RTL description, observing the actual states of the predetermined nodes in RTL description 306, which are sometimes also referred to as actual results, and comparing the actual results with the expected results. The circuit designer may analyze eventual simulation failures (i.e., instances in which the actual results differ from the expected results). If the analysis of simulation failures reveals that the functional performance of RTL description 306 is incomplete or incorrect, the circuit designer can make changes to the HDL code (as an example).

Figure 4:
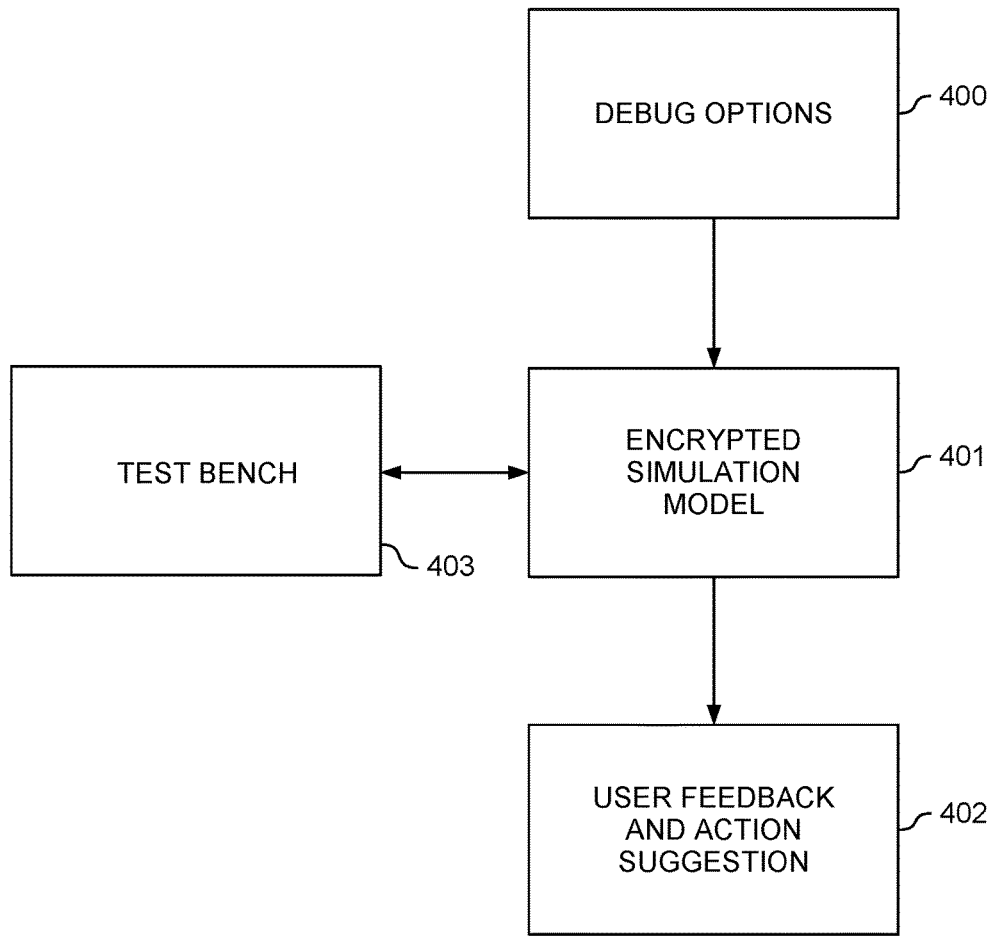
FIG. 4 is a diagram of an illustrative simulation of an IP core that has an encrypted simulation model in accordance with an embodiment.

In some embodiments, RTL description 306 may include IP cores. For example, RTL description 306 may instantiate an IP core and connect the IP core to the remainder of the circuitry in RTL description 306 through a predefined interface. The simulation of an IP core that has an encrypted simulation model is shown in FIG. 4.

As shown, test bench 403 may instantiate the IP core using encrypted simulation model 401 with a set of predetermined parameters. Test bench 403 may control the simulation of the IP core by providing stimuli through a predefined interface to encrypted simulation model 401, which may include a plurality of probes. If desired, debug options 400 may activate at least some probes of the plurality of probes. Debug options 400 may be part of the predefined interface of encrypted simulation model 401. If desired, debug options 400 may be provided as a parameter of the set of predetermined parameters to encrypted simulation model 401.

Test bench 403 may receive signals from the encrypted simulation model through the predefined interface. If desired, test bench 403 may compare the received signals with expected signals. Test bench 403 may detect a simulation failure if the received signals are different than the expected signals. A simulation failure may have different possible causes. For example, encrypted simulation model 401 may be used with an incorrect combination of parameters, the stimuli may be incompatible with the selected parameters, the encrypted simulation model may have a bug, etc.

In some embodiments, encrypted simulation model 401 may provide user feedback and action suggestion 402. For example, consider the scenario in which encrypted simulation model 401 identifies an incorrect combination of parameters as a cause for the simulation failure. In this scenario, encrypted simulation model 401 may suggest a correct combination of parameters as part of user feedback and action suggestion 402. If desired, encrypted simulation model 401 may suggest to execute simulation again with the correct combination of parameters.

Figure 5:
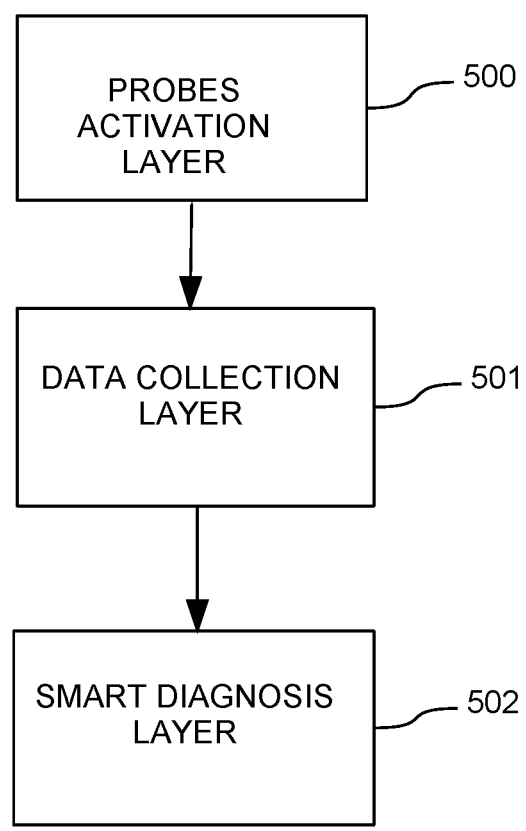
FIG. 5 is a diagram of illustrative components of an encrypted simulation model in accordance with an embodiment.

An encrypted simulation model such as the encrypted simulation model 401 of FIG. 4 may include multiples layers. FIG. 5 shows illustrative components of an encrypted simulation model including a probes activation layer 500, a data collection layer 501, and a smart diagnosis layer 502.

Activating debug options in the encrypted simulation model of FIG. 5 (e.g., debug options 400 of FIG. 4) may enable probes activation 500 during which probes in the encrypted simulation model are turned on and assist in the analysis of signals that propagate through the IP core. Data collection layer 501 of the encrypted simulation model may collect data and perform measurements during the simulation of the IP core. For example, probes that have been activated during probes activation layer 500 may monitor signals at predetermined nodes in the IP core and collect information related to these signals. If desired, the collected information may include generated variations of the monitored signals to anticipate potential error conditions, as an example.

The encrypted simulation model may analyze the collected data in smart diagnosis layer 502. In some embodiments, data collection layer 501 may generate check points at which the collected information related to the monitored signals is analyzed. The encrypted simulation model may include a set of rules, which are sometimes also referred to as rule based constraints (RBCs), and a check point may be associated with at least one rule of the set of rules. In some embodiments, SystemVerilog assertions may implement the rules. If desired, smart diagnosis layer 502 may determine whether the data collected in data collection layer 501 violates a rule of the set of rules.

In response to determining that at least a portion of the data collected in data collection layer 501 violates a rule of the set of rules, the encrypted simulation model may determine in smart diagnosis layer 502 whether one of the variations of the data respects the rule. If desired, smart diagnosis layer 502 of the encrypted simulation model may generate additional variations of the data collected in data collection layer 501 and compare the portion of the data that violates the rule with the generated variations of the data in a root cause analysis to determine a root cause for the rule violation. Once the root cause for the rule violation is identified, smart diagnosis layer 502 may determine a suggested corrective action based on the root cause.

Figure 6:
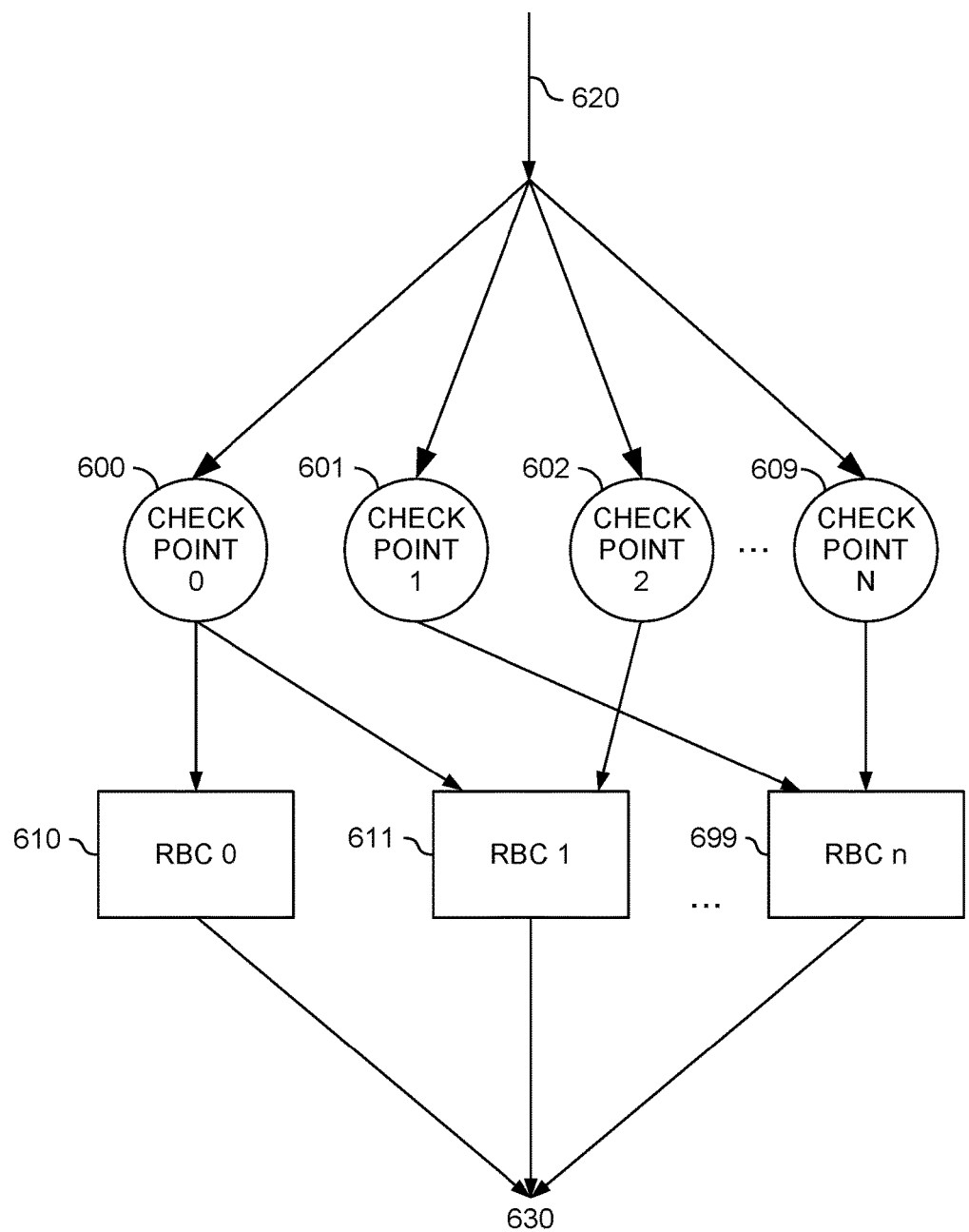
FIG. 6 is a diagram of a flow chart showing illustrative steps that an encrypted simulation model of an IP core may perform during simulation in a data collection layer and a smart diagnosis layer in accordance with an embodiment.

The flow chart in FIG. 6 shows illustrative steps that an encrypted simulation model of an IP core may perform during simulation in a data collection layer (e.g., data collection layer 501 of FIG. 5) and a smart diagnosis layer (e.g., smart diagnosis layer 502 of FIG. 5). The data collection layer may generate check points 600, 601, 602, . . . , 609 and send the collected data 620 to these check points 600, 601, 602, . . . , 609.

The smart diagnosis layer may include a set of rules or rule based constraints 610, 611, . . . , 699. Each of the rules of the set of rules or rule based constraints 610, 611, . . . , 699 may be associated with and receive data from at least one check point 600, 601, 602, . . . , 609. For example, as shown, RBC 610 is associated with check point 600, while RBC 611 is associated with check points 600 and 602, and RBC 699 is associated with check points 601 and 609.

The smart diagnosis layer may check RBCs 610, 611, . . . , 699 using collected data 620 from the associated check points 600, 601, 602, . . . , 609 and provide feedback and suggestions 630 based on the results of the analysis.

As an example, consider an IP core that implements a Clock and Data Recovery (CDR) using a Phase Locked Loop (PLL). Such an IP core is sometimes also referred to as a CDR PLL and may include a voltage controlled oscillator (VCO) and various counters that constitute the feedback loop of the PLL. The CDR PLL may receive serialized data and a reference clock and produce a recovered clock, a first status output that indicates that the CDR is locked to the reference clock, and a second status output that indicates that the CDR is locked to the incoming data.

Consider further that the CDR PLL has an encrypted simulation model with two check points (e.g., check points 600 and 601). For example, a first check point may collect data related to the reset assertion and de-assertion at power up of the CDR PLL, and a second check point may monitor and collect data related to the feedback clock in the feedback loop to the VCO.

If desired, the encrypted simulation model of the CDR PLL may have two rules (e.g., RBCs 610 and 620). The first rule may be based on the first check point and verify whether the input reset signal is pulsed. The second rule may be based on the first and second check points and verify whether the reset sequence is correct and whether the feedback clock has a large variation.

In response to determining that either or both of the first and second rules are violated, the encrypted simulation model may analyze the collected data and provide feedback and suggestions 630. For example, in response to determining that the first rule is violated, the encrypted simulation model may provide the feedback that the CDR PLL is not reset at power up and the suggestion to check the reset sequence. As another example, in response to determining that the second rule is violated, the encrypted simulation model may provide the feedback that the feedback clock in the PLL is not stable and the suggestion to check the frequency of the reference clock.

Figure 7:
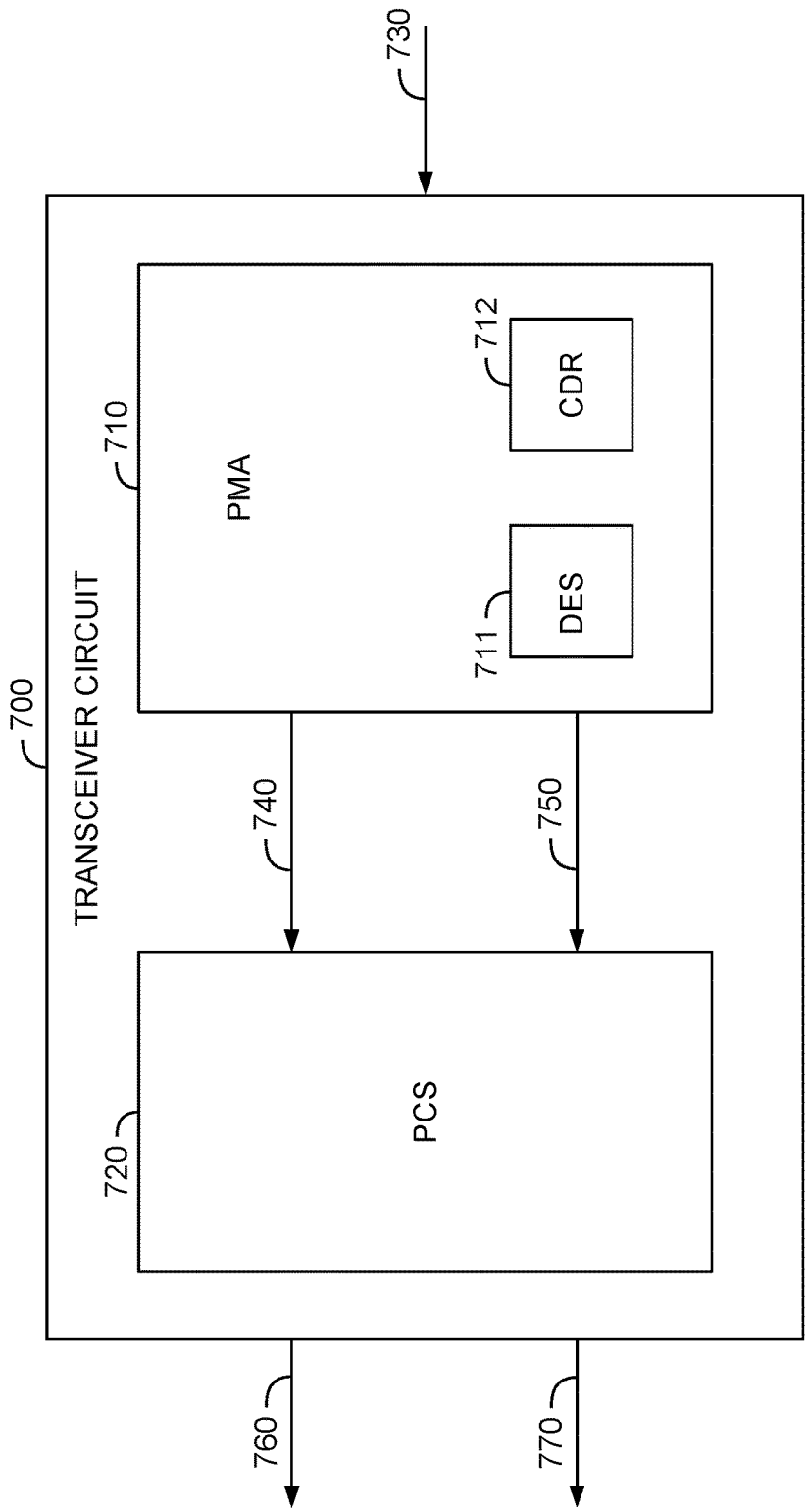
FIG. 7 is a diagram of an illustrative IP core that implements a transceiver circuit having a Physical Media Attachment (PMA) and a Physical Coding Sublayer (PCS) in accordance with an embodiment.

As another example, consider an IP core that implements a transceiver circuit. An illustrative IP core of a transceiver circuit in accordance with an embodiment is shown in FIG. 7. As shown, transceiver circuit 700 may include a Physical Media Attachment (PMA) 710 and a Physical Coding Sublayer (PCS) 720. PMA 710 may include deserializer (DES) circuitry 711 and clock and data recovery (CDR) circuitry 712.

PMA 710 of transceiver circuit 700 may receive serial input data 730. CDR 712 may retrieve recovered clock signal 750 and a data signal from serial input data 730. DES 711 may parallelize the data signal to generate recovered data signal 740. PCS 720 may perform addition operations (e.g., word alignment, 8b/10b decoding, descrambling, etc.) (not shown) on recovered data signal 740 and/or recovered clock signal 750 to produce signals 760 and 770, respectively.

Consider the scenario in which the transceiver circuit supplies signals 760 and 770 to another circuit and that the two circuits are simulated together. Consider further that the other circuit has an unencrypted simulation model, that the IP core has an encrypted simulation model, and that activating debug options (e.g., debug options 400 of FIG. 4) activates probes in the encrypted simulation model that monitor recovered data signal 740 and recovered clock signal 750.

In this scenario, the implementation of encrypted simulation model may include various check points (e.g., check points 600, 601, ..., 609 of FIG. 6) that collect and monitor serial input data 730, recovered data signal 740 (e.g., recovered data) and recovered clock 750 signal.

For example, a first check point (CKP1) may collect 64 bits of serial input data 730 (e.g., serial_stream). A second check point (CKP2) may create 63 64-bit long parallel bit streams (e.g., parallel_bitstream1, parallel_bitstream2, ..., parallel_bitstream63) which may be shifted versions of the serial_bitstream. A smart diagnosis layer of the encrypted simulation model (e.g., smart diagnosis layer 502 of FIG. 5) may include rules or RBCs. One rule (e.g., RBC1) may use check points CKP1 and CKP2 to determine whether recovered data signal 740 is not equal to any one of the parallel bit streams:

$$\text{if (recovered\_data!=(parallel\_bitstream1/parallel\_bitstream2/ ... /parallel\_bitstream63))} \quad (1)$$

In response to determining that the rule of equation (1) is violated, the encrypted simulation model may generate the following feedback and suggestion: "Deserializer is not recovering correct data based on serial input. Problem seems to be in the PMA. Look into CDR and recovered clock. Activate probe n for more details."

In response to determining that the rule of equation (1) is respected, the encrypted simulation model may generate the following feedback message: "Deserializer data looks correct. Look further in the PCS. Activate probe m for more details."

Figure 8:
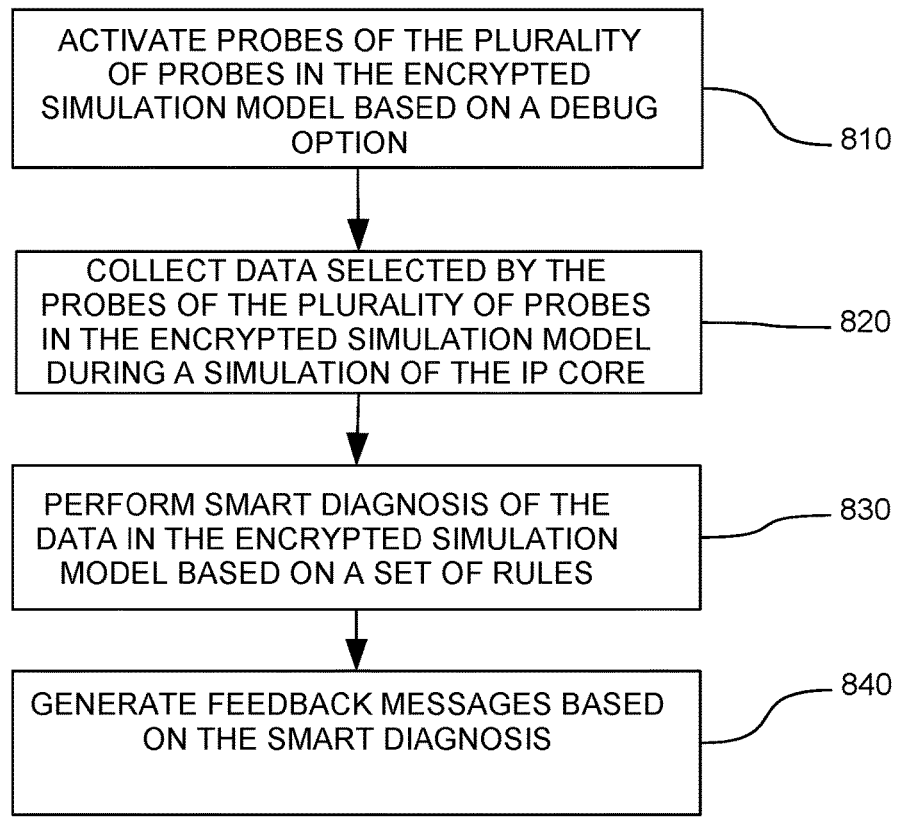
FIG. 8 is a diagram of a flow chart showing illustrative steps for modeling an IP core with an encrypted simulation model that includes a plurality of probes in accordance with an embodiment.

FIG. 8 is a diagram of a flow chart showing illustrative steps for modeling an IP core with an encrypted simulation model (e.g., simulation model 401 of FIG. 4) that includes a plurality of probes in accordance with an embodiment.

During step 810, modeling the IP core may involve activating probes of the plurality of probes in the encrypted simulation model based on a debug option. For example, probes activation 500 of FIG. 5 may activate probes of the plurality of probes.

During step 820, modeling the IP core may involve collecting data selected by the probes of the plurality of probes in the encrypted simulation model during a simulation of the IP core. For example, the encrypted simulation model may collect data in data collection layer 501 of FIG. 5.

During step 830, modeling the IP core may involve performing smart diagnosis of the data in the encrypted simulation model based on a set of rules. For example, RBCs 610, 611, ..., 699 of FIG. 6 may be used for performing the smart diagnosis.

During step 840, the encrypted simulation model may generate feedback messages based on the smart diagnosis. For example, user feedback and action suggestion 402 may generate feedback messages.

In some embodiments, the simulation of an integrated circuit design may involve using more than one simulation model. For example, a first simulation model may describe the behavior of a first portion of an integrated circuit design and a second simulation model may describe the behavior of an IP core that is embedded in the integrated circuit design and coupled to the first portion.

Figure 9:
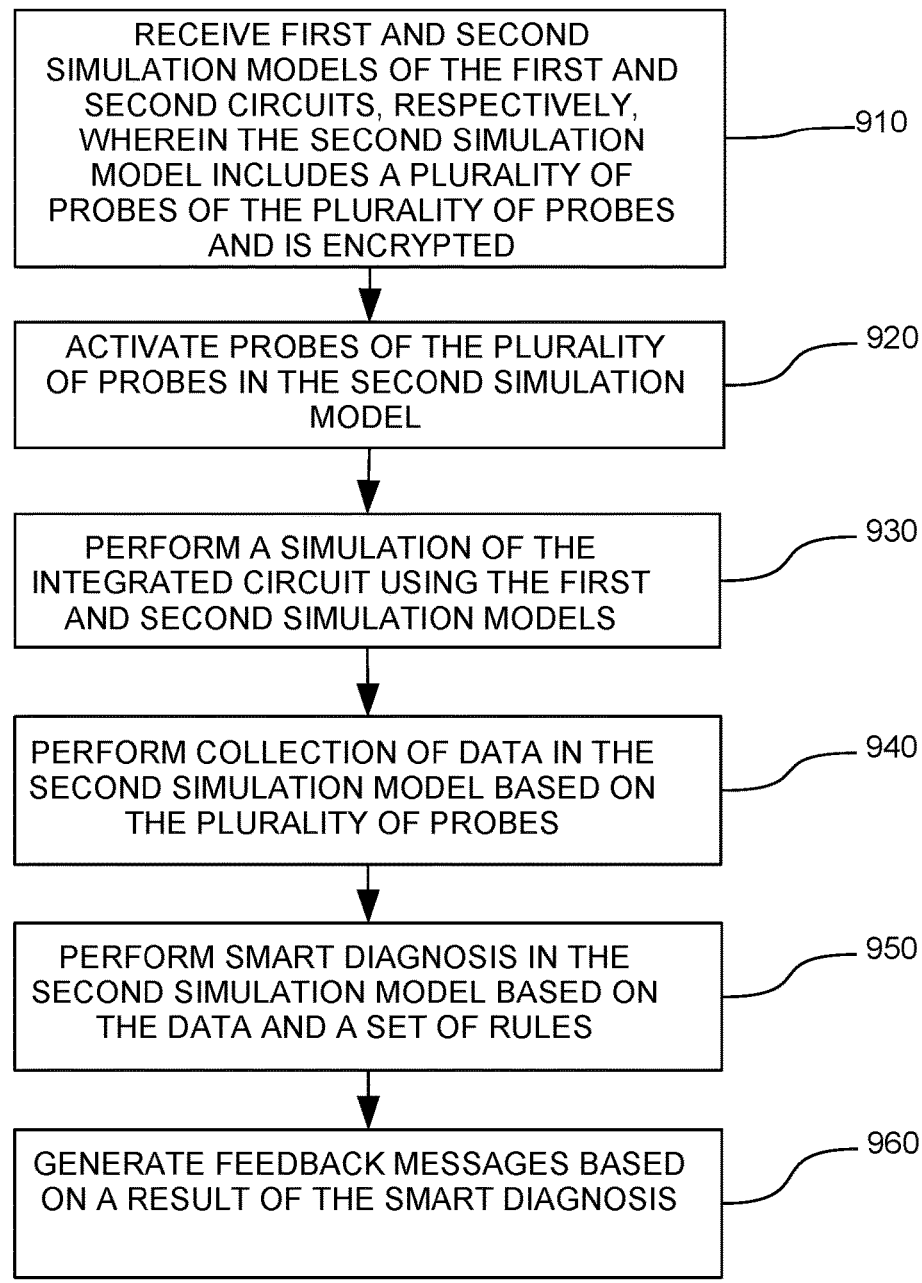
FIG. 9 is a diagram of a flow chart showing illustrative steps for operating a simulator to perform simulation of a first and second circuit using first and second simulation models in accordance with an embodiment.

FIG. 9 is a diagram of a flow chart showing illustrative steps for operating a simulator to perform simulation of a first and second circuit using first and second simulation models in accordance with an embodiment.

During step 910, the simulator may receive first and second simulation models of the first and second circuits, respectively, wherein the second simulation model includes a plurality of probes and is encrypted. For example, behavioral simulation tools 272 of FIG. 2 may receive two simulation models. One of the simulation models may model an IP core and be encrypted. If desired, the encrypted simulation model may include a plurality of probes.

During step 920, the simulator may activate probes of the plurality of probes in the second simulation model. For example, probes activation 500 of FIG. 5 may activate probes of the plurality of probes in the second simulation model.

During step 930, the simulator may perform a simulation of the integrated circuit using the first and second simulation models. For example, behavioral simulation tools 272 of FIG. 2 may perform such a simulation.

During step 940, the simulator may perform data collection in the second simulation based on the plurality of probes. For example, the simulation model of FIG. 5 may perform data collection in data collection layer 501.

During step 950, the simulator may perform smart diagnosis in the second simulation model based on the data and a set of rules. For example, the simulation model of FIG. 5 may perform smart diagnosis in smart diagnosis layer 502.

During step 960, the simulator may generate feedback messages based on a result of the smart diagnosis. For example, user feedback and action suggestion 402 of FIG. 4 may generate feedback messages.

Figure 10:
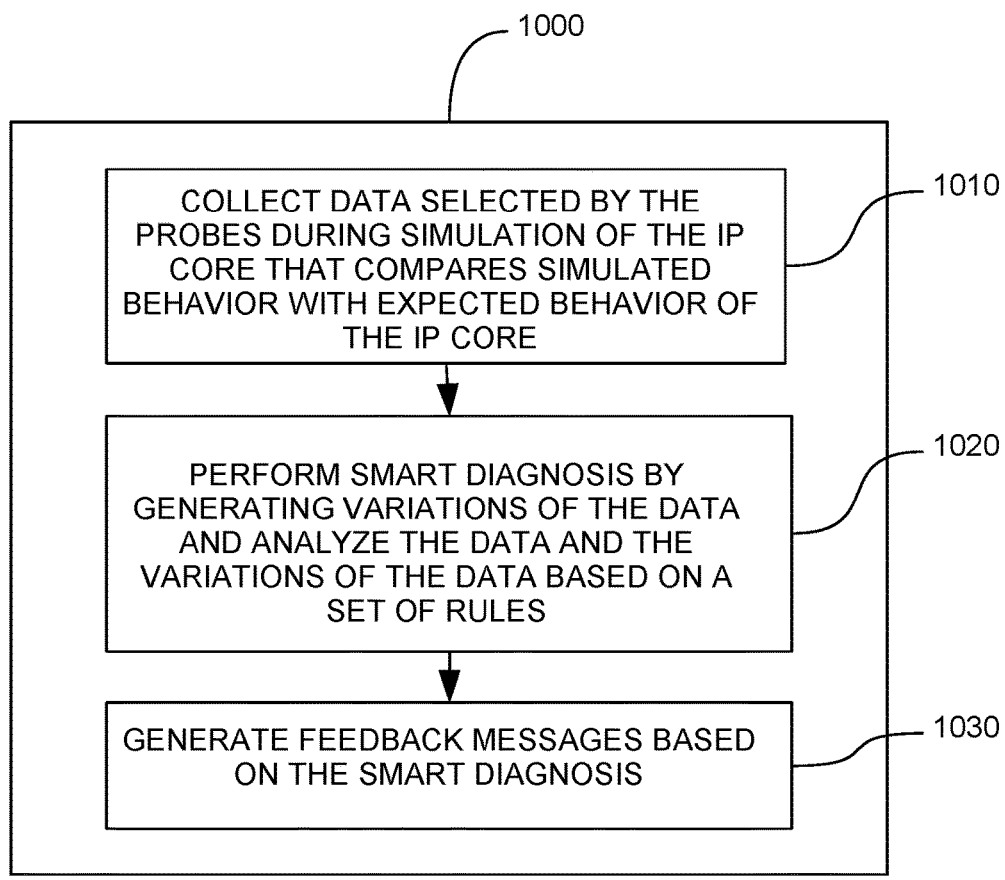
FIG. 10 is a diagram of a flow chart showing illustrative instructions for modeling an IP core with a simulation model that is at least partially encrypted and includes probes in accordance with an embodiment.

FIG. 10 is a diagram of flow chart 1000 which shows illustrative instructions for modeling an IP core with a simulation model that is at least partially encrypted and includes probes.

During 1010, the instructions for modeling the IP core may include collecting data selected by the probes during simulation of the IP core that compares simulated behavior with expected behavior of the IP core. For example, the encrypted simulation model of FIG. 5 may collect data in data collection layer 501.

During 1020, the instructions for modeling the IP core may include performing smart diagnosis by generating variations of the data and analyzing the data and the variations of the data based on a set of rules. For example, the encrypted simulation model of FIG. 5 may perform smart diagnosis in smart diagnosis layer 502.

During 1030, the instructions for modeling the IP core may include generating feedback messages based on the smart diagnosis. For example, the encrypted simulation model of FIG. 4 may generate feedback messages in user feedback and action suggestion 402.

The method and apparatus described herein may be incorporated into any suitable electronic device or system of electronic devices. For example, the method and apparatus may be incorporated into numerous types of devices such as microprocessors or other integrated circuits. Exemplary integrated circuits include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), coarse-grained reconfigurable architectures (CGRAs), application specific standard products (ASSPs), application specific integrated circuits (ASICs), just to name a few.

The integrated circuit described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of assisting with the simulation of IP cores, for example through generating feedback messages and suggestions during the simulation of IP core is desirable, especially if the IP core is modeled using an encrypted simulation model.

The integrated circuit may be configured to perform a variety of different logic functions. For example, the integrated circuit may be configured as a processor or controller that works in cooperation with a system processor. The integrated circuit may also be used as an arbiter for arbitrating access to a shared resource in the data processing system. In yet another example, the integrated circuit may be configured as an interface between a processor and one of the other components in the system. In one embodiment, the integrated circuit may be one of the families of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing.

The foregoing is merely illustrative of the principles of the embodiments and various modifications can be made by those skilled in the art without departing from the scope and spirit of the embodiments disclosed herein. The foregoing embodiments may be implemented individually or in any combination. The above described embodiments are presented for purposes of illustration and not of limitation, and the present invention is limited only by the claims that follow.

What is claimed is:

1. A method for utilizing an encrypted simulation model that includes a plurality of probes, comprising:
    activating probes of the plurality of probes in the encrypted simulation model based on a debug option;
    collecting data selected by the probes of the plurality of probes in the encrypted simulation model during a simulation of an IP core by generating check points that monitor simulation signals when performing the simulation of the IP core and generating variations of the simulation signals that anticipate potential error conditions;
    performing smart diagnosis of the data in the encrypted simulation model based on a set of rules;
    generating feedback messages based on the smart diagnosis
    editing the IP core in response to the diagnosis;
    generating a program file that includes the edited IP core; and
    programming a programmable logic device with the program file to transform programmable resources to implement the edited IP core.

2. The method of claim 1, wherein activating probes of the plurality of probes further comprises:
    activating the debug option; and
    in response to activating the debug option, selectively activating at least a subset of the plurality of probes in the encrypted simulation model.

3. The method of claim 1, wherein performing smart diagnosis further comprises:
    determining whether at least a portion of the data violates a rule of the set of rules.

4. The method of claim 3, wherein performing smart diagnosis further comprises:
    in response to determining that the at least a portion of the data violates the rule of the set of rules,
    performing a root cause analysis to identify a reason that the data violates the rule.

5. The method of claim 4, wherein generating feedback messages further comprises:
providing a suggested corrective action based on the reason that the data violates the rule.

6. The method of claim 1, wherein performing smart diagnosis further comprises:
comparing the variations of the simulation signals with an expected signal to identify a reason that at least a portion of the data violates a rule of the set of rules.

7. A method for designing an integrated circuit that includes first and second circuits, comprising:
receiving first and second simulation models of the first and second circuits, respectively, wherein the second simulation model includes a plurality of probes and is encrypted;
activating probes of the plurality of probes in the second simulation model;
performing a simulation of the integrated circuit using the first and second simulation models;
performing collection of data in the second simulation model based on the plurality of probes by receiving a signal from the first simulation model with the second simulation model, and generating variations of the signal to anticipate potential error conditions;
performing smart diagnosis in the second simulation model based on the data and a set of rules by determining whether the signal violates a rule of the set of rules;
generating feedback messages based on a result of the smart diagnosis;
editing the integrated circuit in response to the smart diagnosis;
generating a program file that includes the edited integrated circuit; and
programming a programmable logic device with the program file to transform programmable resources to implement the edited integrated circuit.

8. The method of claim 7, wherein the second simulation model further comprises:
activating a debug option; and
in response to activating the debug option, selectively activating at least a subset of the plurality of probes in the second simulation model.

9. The method of claim 7, further comprising:
in response to determining that the signal violates the rule of the set of rules, performing a root cause analysis to identify a reason that the signal violates the rule.

10. The method of claim 9, further comprising:
providing a suggested corrective action to prevent that the signal violates the rule based on the reason that the data violates the rule.

11. The method of claim 9, wherein performing the root cause analysis further comprises:
comparing the variations of the signal with an expected signal to identify the reason that the signal violates the rule.

12. A non-transitory computer-readable data storage medium encoded with instructions for modeling an IP core with a simulation model that is at least partially encrypted and includes probes, the instructions comprising:
collecting data selected by the probes during a simulation of the IP core that compares simulated behavior with expected behavior of the IP core by generating check points that monitor simulation signals when performing the simulation of the IP core, and generating variations of the simulation signals that anticipate potential error conditions;
performing smart diagnosis by generating variations of the data and analyzing the data and the variations of the data based on a set of rules;
generating feedback messages based on the smart diagnosis;
editing the IP core in response to the smart diagnosis;
generating a program file that includes the edited IP core; and
programming a programmable logic device with the program file to transform programmable resources to implement the edited IP core.

13. The non-transitory computer-readable data storage medium of claim 12, further comprising instructions for:
activating a debug option;
in response to activating the debug option, selectively activating at least a subset of the probes; and
generating check points that monitor the data at the at least a subset of the probes.

14. The non-transitory computer-readable data storage medium of claim 12, wherein performing smart diagnosis further comprises instructions for:
determining whether the data violates a rule of the set of rules.

15. The non-transitory computer-readable data storage medium of claim 14, further comprising instructions for:
in response to determining that the data violates the rule of the set of rules, determining whether one of the variations of the data respects the rule; and
in response to determining that the one of the variations of the data respects the rule, comparing the data with the one of the variations of the data to determine a root cause.

16. The non-transitory computer-readable data storage medium of claim 15, further comprising instructions for:
determining a suggested corrective action based on the root cause.

* * * * *